J. W. Ross.
Inkstand.

No. 1,029.

Reissued Mar. 8, 1864.

Witnesses:

Joseph Garett

Albert W. Brown

Inventor:

Joseph W. Ross by his atty

Eva Lincoln

UNITED STATES PATENT OFFICE.

JOSEPH W. ROSS, OF BOSTON, MASSACHUSETTS.

IMPROVEMENT IN INKSTANDS.

Specification forming part of Letters Patent No. 32,207, dated April 30, 1861; Reissue No. 1,629, dated March 8. 1864.

*To all whom it may concern:*

Be it known that I, JOSEPH W. ROSS, of Boston, in the county of Suffolk and State of Massachusetts, have invented certain new and useful Improvements in Inkstands; and I do hereby declare that the following description, in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The figures of the accompanying plate of drawings represent my improvements.

Figure 1:
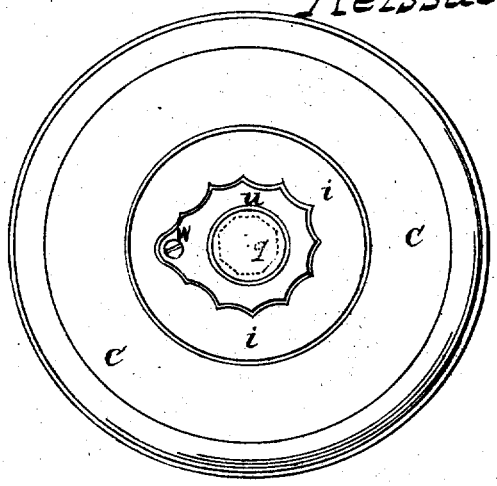
Figure 2:
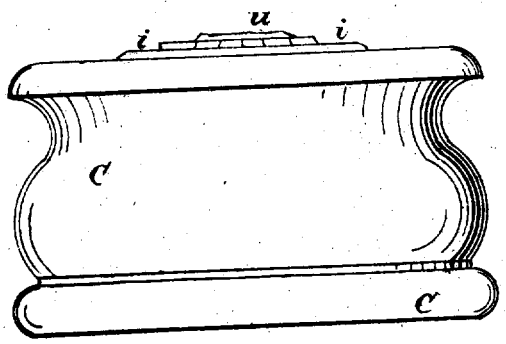
Figure 3:
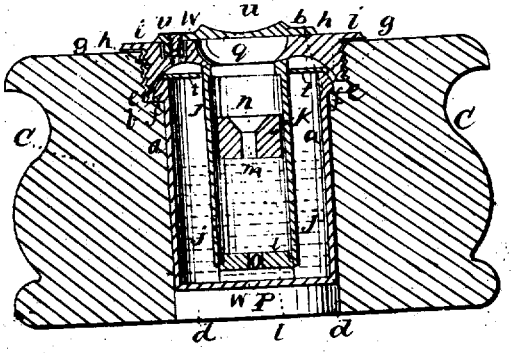
Figure 4:
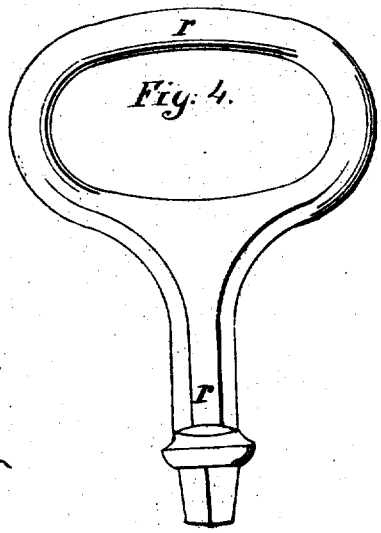

Figure 1 is a plane or top view. Fig. 2 is a side view. Fig. 3 is a central vertical section. Fig. 4 is a detail view, to be hereinafter referred to.

One great disadvantage always to be met with in the use of stands or fountains for containing ink has been that, in consequence of the manner in which the same have been arranged, a greater portion or all of the surface of the ink was exposed to the atmosphere, which absorbed its moisture and thus caused it to become thick and "muddy."

Many inkstands have been invented to protect the ink from the deteriorating effects of exposure to the external air or to render the inkstand, after having been used, perfectly air-tight, but they have not generally succeeded in accomplishing the desired result of preserving the ink always in its liquefied state without so complicating their construction as to render them practically inoperative and very inconvenient in use.

By the arrangement of the devices composing the inkstand according to my improvements but a very small and inconsiderable portion of the surface of the ink is exposed to the external air, and, moreover, by my improvements I so secure the ink well or fountain, by means of a key or other suitable locking device, in the desk, flush or nearly so with the top thereof, as to prevent any tampering with the same and rendering its removal without the use of a suitable key impossible.

*a a* in the drawings represent the well or fountain for containing the ink, made of a cylindrical form and having a lip, *b*, formed around its mouth. *c* is the stand or the top of a desk, in which is sunk a socket, *d*, corresponding to the outside diameter of the well *a*, the upper portion, *e*, being made of a larger diameter, thereby forming the shoulder or rest *f* for the lip *b* of the well or fountain, when placed in the socket *c*, to rest upon. In the larger portion *e* of the socket *d* is a female screw, *g*, which receives the male screw *h* attached to a thin top plate, *i*. To the top plate, *i*, is also secured a tube, *j*, in which is a float, *k*, the float being prevented from dropping out of the same by a stopper, *l*, placed in its lower end. In the float *k* is a very small orifice, *m*, which extends through its entire thickness with its upper opening rimmed out, forming a tunnel, *n*. An orifice, *o*, is also formed in the stopper *l*, extending through its entire thickness, and which has communication with the ink by a gutter or way, *p*, in the lower surface of the stopper *l*.

In the top plate, *i*, of the inkstand is a mouth or opening, *q*, made of a polygonal or other suitable shape, and in which mouth, when the ink-well is to be placed in or removed from the desk, a key, *r*, is inserted, the periphery of the portion *x* of said key which is inserted in said opening being of corresponding shape to that of the mouth of the well.

The ink well is first placed in the opening *d* of the desk and the cover or top plate, *i*, then forced down upon the same by means of the key before referred to until it is made to be flush, or sufficiently so, with the top of the desk as to prevent any removal of the well from the desk except by means of the key used to insert it therein, thereby preventing tampering or injuring of the same, which is apparent is a great desideratum for school purposes. When the top plate, *i*, is forced home, the lower surface of the stopper *l* presses against the bottom of the well *a*, and the rubber washer *t*, placed upon the top of the same, is pressed or squeezed between the lip *b* and the under surface of the top plate, *i*, which serves to render the ink-well in a measure air-tight.

The well *a* having been sufficiently filled with ink placed in its socket *c*, and the top plate, *i*, screwed in the same, as above described, the ink will rise in the tube *j*, passing through the orifice *o* of the stopper *l* to the same height as in the well, and consequently raise the float *k*, which is sufficiently light to always remain, except when depressed by any external means, upon the top surface of the ink, the tube *j* serving as a guide to the float *k*. By thus arranging the inkstand it will be seen that the amount of ink surface exposed to the external air is the area of the very small and inconsiderable hole *m* of the float *k*, whereby the ink is prevented from becoming muddy and thick and always preserved in its liquefied state. By inserting the pen in the mouth or opening of the tube *j* it will strike or impinge against the float *k*, causing it to descend and force up the ink through the hole *m* of the same; and upon removing the pen the float *k* will again resume its original position upon the surface of the ink. (In the drawings the ink is represented by dotted red lines, Fig. 3.)

*u* is a cover with a projection, *v*, upon its lower surface, which turns in a socket of the top plate, *i*. This cover *u* is secured to the top plate by a screw, *w*, which passes loosely through the projection *v* and screws into the top plate, *i*, as represented in Fig. 3. By thus hanging or securing the cover to the inkstand I obtain a reliable and permanent hinge and give more stability to the swinging of the cover than could otherwise be obtained by the use of a single pivot. When the inkstand is not used, it is rendered perfectly air-tight by sliding the cover *u* over the mouth of the same.

Having thus described my improvements, I shall state my claims as follows:

What I claim as my invention, and desire to secure by Letters Patent, is—

1. The use of the float *k*, traveling in a suitable guiding-tube, and operating substantially as hereinabove described.

2. So arranging and constructing an ink well or fountain that its cover or top surface can be brought flush, or nearly so, with the top of the desk, and so that the cover or inkwell can not be locked in or removed from the same without the use of a key or other instrument, substantially as set forth.

JOSEPH W. ROSS.

Witnesses:
ALBERT W. BROWN,
BENJAMIN MANN.